United States Patent [19]
Cucchi

[11] Patent Number: 6,044,736
[45] Date of Patent: Apr. 4, 2000

[54] ROTARY BAR LOADER WITH BRAKING AND POSITIONING DEVICE FOR AUTOMATIC LATHE

[75] Inventor: Pietro Cucchi, Bussero, Italy

[73] Assignee: Pietro Cucchi S.p.A., Italy

[21] Appl. No.: 09/236,451

[22] Filed: Jan. 25, 1999

[30] Foreign Application Priority Data

Feb. 6, 1998 [IT] Italy .................................. MI98U0067

[51] Int. Cl.[7] .................................................. B23B 13/04
[52] U.S. Cl. ............................... 82/127; 82/124; 82/126; 414/14
[58] Field of Search ............................. 82/127, 126, 125, 82/124; 414/14, 17, 18, 736; 188/72.9, 73.1, 73.2, 73.34, 73.45

[56] References Cited

U.S. PATENT DOCUMENTS

| | | | |
|---|---|---|---|
| 2,236,440 | 3/1941 | Miller | 82/118 X |
| 2,855,815 | 10/1958 | Miller | 82/127 |
| 4,019,411 | 4/1977 | Bohn et al. | 82/126 |
| 5,117,544 | 6/1992 | Kousaku et al. | 82/118 X |
| 5,679,083 | 10/1997 | Eom | 474/5 |

*Primary Examiner*—Henry W. H. Tsai
*Attorney, Agent, or Firm*—Shlesinger, Fitzsimmons & Shlesinger

[57] ABSTRACT

A rotary loader for feeding bars to lathes comprises a stepped rotary drum (11) and supporting guides (13) for sliding of the bars. A flange (16) coaxial and integral with the drum supports peripherally braking surfaces (17) such as pins arranged with a pitch equal to the drum braking pitch. An opposing surface (20) is pushed elastically towards the drum rotation axis to meet the braking surfaces in sequence and supply drum braking and stopping action against its inertial movement.

10 Claims, 1 Drawing Sheet

ROTARY BAR LOADER WITH BRAKING AND POSITIONING DEVICE FOR AUTOMATIC LATHE

BACKGROUND OF THE INVENTION

The present invention relates to a loader of the type for automatic lathes with multiple mandrels.

These loaders generally have a rotary drum supporting a plurality of guides along which are pushed bars to be fed to the multiple mandrels of an automatic lathe. The drum rotates to bring the bars opposite the various machining mandrels in sequence. The drum must be rotated and stopped in the new position with high speed and accuracy. Since the operating speeds of the machines and the masses in play are high the problem of assuring correct braking and stopping is particularly critical. It is noted that in the severest cases the drum must rotate 60° in only 0.2 seconds and then be stopped accurately.

In the prior art it has been proposed to use disc or drum brakes activated by compressed air to stop the inertial movement of the drum. A synchronization mechanism frees the brake during rotation to then reactivate it near the new stopping and machining position. This complicates the structure of the machine and introduces parts subject to wear. In addition, it is always possible for the mechanism to fail in the braking e.g. because of wear, breakage or desynchronization resulting in damage.

The general purpose of the present invention is to obviate the above mentioned drawbacks by making available a simple and surely effective rotary lathe-loader having an innovative braking and positioning device without need of complicated activating devices.

SUMMARY OF THE INVENTION

In view of this purpose it was sought to provide in accordance with the present invention a rotary loader for feeding bars to lathes comprising a stepped rotary drum and supporting bar-sliding guides characterized in that it comprises a flange coaxial and integral with the drum and supporting peripherally braking surfaces arranged with a pitch equal to the braking pitch of the drum with an opposing surface being pushed elastically towards the drum rotation axis to meet in sequence the braking surfaces and supply the drum's braking and stopping action against its inertial movement.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
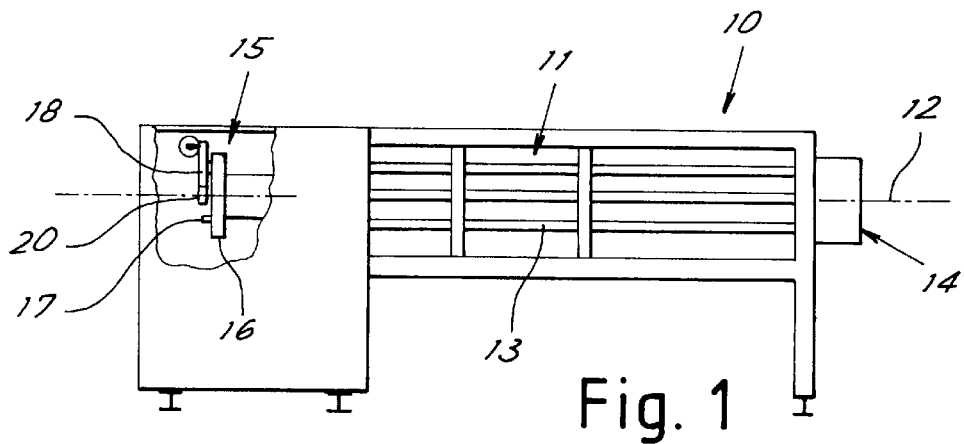
FIG. 1 shows a diagrammatic side elevation view of a loader in accordance with the present invention.

With reference to the figures, FIG. 1 shows a loader for feeding bars to an automatic lathe (not shown). The loader is indicated as a whole by reference number 10 and comprises a drum 11 intermittently rotated a given angle or pitch around a central axis 12 and bearing on its periphery a plurality of guides 13 along which run bars to be fed to the lathe through an outlet head 14. The loader with its pushers, the guide opening and bar loading mechanism has a bar feeding structure which is virtually known and readily imaginable by one skilled in the art and will therefore not be further described or shown in detail.

In accordance with the innovative principles of the present invention, behind the rotary drum is located an innovative braking and positioning device indicated generally by reference number 15.

Figure 2:
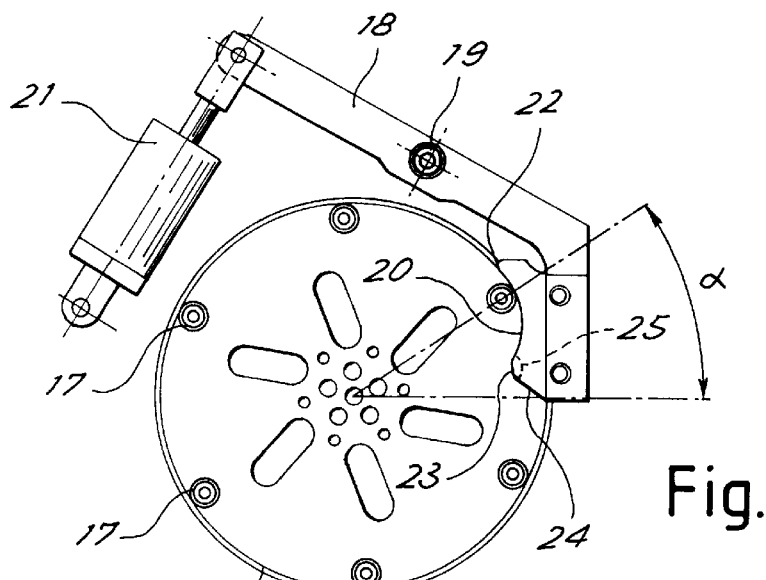
FIGS. 2 and 3 show front views of a braking and positioning device for the loader of FIG. 1.

As may be seen in FIG. 2 this device comprises a flange in disc form 16 integral and coaxial with the drum and bearing around its periphery a plurality of angularly spaced pins 17 forming braking surfaces having pitch angles equal to the drum stop pitch angle. An arm 18 is hinged at 19 to the loader frame to rotate parallel with the plane of the disc 16 and bears at one end an opposing cam surface 20. At the other end of the arm 18 elastic actuating means for effecting rotation of the arm act to push the cam surface 24 towards the drum axis and then against the braking surfaces on the pins 17 that are integral with the drum. The elastic means can be provided with a spring or hydraulic decelerator.

Advantageously the braking surfaces are made with the pins 17 being arranged with the desired pitch for angular positioning of the drum. Each pin has thereon a freely rotary hardened bush forming its breaking surface. Again advantageously the opposing surface is made with a cam 20 designed for sequential contact with the breaking surfaces of pins 17. The cam 20 has a profile such as to meet the pin breaking surfaces 17 gradually during drum rotation. More in particular the cam has one end for connection or pin entry 22 and a pin stop area 23. Between the connection end and the stop area the cam has a gradual curvature towards the axis of the drum. After the stop area 23 the cam has a final section 24 with steep angle towards the exterior of the axis.

The movement inward of the cam towards axis 12 has an end or limit position in which the connection end is slightly outward of the circumference described by the pins 17 during drum rotation. In this manner during rotation the pins sequentially meet this connection end 22 and run along the surface of the cam as shown in FIG. 2. The rotation angle $\alpha$ in contact with the cam can be e.g. between 40° and 20° and advantageously around 35°.

Figure 3:
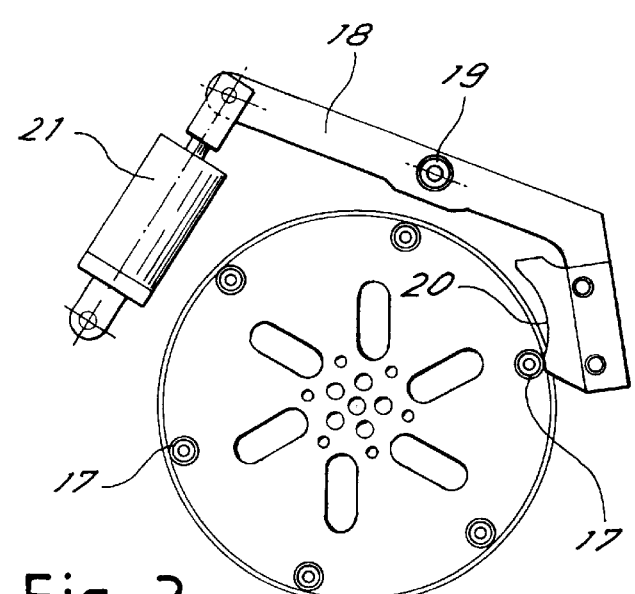

By appropriately calibrating the force impressed by the elastic means 21 the pin that runs along the cam brakes drum movement with a gradual and effective damping of drum inertia. The drum is stopped in the position of FIG. 3 when the pin engages the stop area 23, and the loader can perform the conventional operations of axial translation of the bars fed. The stop area 23 can also be given a recess 25 as shown in broken lines in the figure for accurate stopping of the pin 17.

At this point it is clear that the preset purposes have been achieved.

With each rotation of the drum, braking and stopping take place automatically upon the meeting of the following pin with the cam without the need of operating active mechanisms or special synchronization devices for rotation and braking action.

The mechanism is robust and with a minimum of wear resulting only from the rubbing of the pin against the cam both of which have hardened surfaces.

Naturally the above description of an embodiment applying the innovative principles of the present invention is given by way of non-limiting example of said principles within the scope of the exclusive right claimed here.

Although the embodiment shown is the preferred one it could be sought to provide a mirror-image arrangement of the pins and cam i.e. a plurality of cam surfaces integral with the drum and meeting sequentially a generally pin-like member supported by the arm 18. The flange 16 could be an integral part of the drum.

What is claimed is:

1. Rotary loader for feeding bars to lathes comprising a stepped rotary drum intermittently rotated a given pitch angle, and having supporting guides thereon for sliding of the bars to a lathe, a flange coaxial and integral with the drum and supporting coaxially thereon a circular array of braking surfaces spaced from each other at a pitch angle equal to the pitch angle of the drum, and an opposing surface being pushed by elastic means elastically towards the drum rotation axis to meet said braking surfaces intermittently and in sequence to supply braking and stopping action to the drum against its inertial movement.

2. Loader in accordance with claim 1 characterized in that the braking surfaces are provided by angularly spaced pins arranged with a pitch angle equal to the drum pitch angle.

3. Loader in accordance with claim 1 characterized in that said opposing surface is a cam surface formed on a cam and having a profile gradually meeting a respective braking surface during the drum rotation.

4. Loader in accordance with claim 1 characterized in that said opposing surface is supported at one end of an arm mounted intermediate its end to rotate around an axis against the action of said elastic means.

5. Loader in accordance with claim 4 characterized in that the elastic means comprise a hydraulic decelerator.

6. Loader in accordance with claim 3 characterized in that said cam has adjacent one end thereof an inlet for connection to a braking surface, and adjacent its opposite end a stopping area, with the cam having a gradual curvature towards the drum axis between the inlet end and the stopping area.

7. Loader in accordance with claim 6 characterized in that after the stopping area the cam has a final section with a steep angle extending away from the drum axis.

8. Loader in accordance with claim 1 characterized in that the contact between the braking surface and the opposing surface takes place with a drum rotation angle between 40° and 20°.

9. Loader in accordance with claim 3 characterized in that the cam surface has therein a recess for reception of a braking surface to effect the drum stopping action thereof.

10. Loader in accordance with claim 8, wherein said contact between the braking surface and the opposing surface takes place with a drum rotation angle of around 35°.

* * * * *